(12) United States Patent
Agrawal et al.

(10) Patent No.: US 12,591,892 B2
(45) Date of Patent: Mar. 31, 2026

(54) FOR EARLY DETECTION OF A MERCHANT DATA BREACH THROUGH MACHINE-LEARNING ANALYSIS

(71) Applicant: Visa International Service Association, San Francisco, CA (US)

(72) Inventors: Shubham Agrawal, Round Rock, TX (US); Claudia Carolina Barcenas Cardenas, Austin, TX (US); Chiranjeet Chetia, Round Rock, TX (US); Hangqi Zhao, Seattle, WA (US)

(73) Assignee: Visa International Service Association, San Francisco, CA (US)

( * ) Notice: Subject to any disclaimer, the term of this patent is extended or adjusted under 35 U.S.C. 154(b) by 960 days.

(21) Appl. No.: 17/261,208

(22) PCT Filed: Jul. 23, 2018

(86) PCT No.: PCT/US2018/043224
§ 371 (c)(1),
(2) Date: Jan. 19, 2021

(87) PCT Pub. No.: WO2020/023003
PCT Pub. Date: Jan. 30, 2020

(65) Prior Publication Data
US 2021/0279731 A1     Sep. 9, 2021

(51) Int. Cl.
G06Q 40/12     (2023.01)
G06F 21/55     (2013.01)
(Continued)

(52) U.S. Cl.
CPC ....... *G06Q 20/4016* (2013.01); *G06F 21/554* (2013.01); *G06N 5/02* (2013.01);
(Continued)

(58) Field of Classification Search
CPC .. G06Q 20/4016; G06Q 40/12; G06Q 20/407; G06Q 30/0185; G06N 20/00; G06N 5/02; G06F 21/554; G06F 2221/034
See application file for complete search history.

(56) References Cited

U.S. PATENT DOCUMENTS 10,068,235 B1 * 9/2018 Boates ............... G06Q 20/4016
11,379,855 B1 * 7/2022 Anderson .............. G06N 20/00
(Continued)

*Primary Examiner* — Azam A Ansari
(74) *Attorney, Agent, or Firm* — The Webb Law Firm

(57) ABSTRACT

Described are a system, method, and computer program product for early detection of and response to a merchant data breach through machine-learning analysis. The method includes receiving transaction data associated with a plurality of transactions and receiving fraudulent transaction data representative of at least one previously identified data-breach incident. The method also includes generating a first model input dataset associated with the at least one merchant and a second model input dataset associated with the at least one previously identified data-breach incident. The method also includes training at least one machine-learning prediction model to associate merchants with a likelihood of data breach and determining at least one breached merchant of the at least one merchant. The method further includes generating a communication configured to cause at least one action to be taken in response to the determination of the at least one breached merchant.

12 Claims, 5 Drawing Sheets

(51) Int. Cl.
| | |
|---|---|
| *G06N 5/02* | (2023.01) |
| *G06N 20/00* | (2019.01) |
| *G06Q 20/40* | (2012.01) |
| *G06Q 30/018* | (2023.01) |

(52) U.S. Cl.
CPC ........... *G06N 20/00* (2019.01); *G06Q 20/407* (2013.01); *G06Q 30/0185* (2013.01); *G06Q 40/12* (2013.12); *G06F 2221/034* (2013.01)

(56)                References Cited

U.S. PATENT DOCUMENTS

| | | | |
|---|---|---|---|
| 2011/0238564 A1* | 9/2011 | Lim | G06Q 40/02 705/38 |
| 2011/0320246 A1* | 12/2011 | Tietzen | G06Q 30/0233 705/14.4 |
| 2013/0282562 A1* | 10/2013 | Gallo | G06Q 20/12 705/39 |
| 2015/0032604 A1* | 1/2015 | Kearns | G06Q 20/023 705/39 |
| 2015/0073981 A1* | 3/2015 | Adjaoute | G06Q 20/384 705/39 |
| 2017/0286962 A1* | 10/2017 | Lai | G06Q 20/4016 |

* cited by examiner

100

FOR EARLY DETECTION OF A MERCHANT DATA BREACH THROUGH MACHINE-LEARNING ANALYSIS

CROSS REFERENCE TO RELATED APPLICATION

This application is the United States national phase of International Application No. PCT/US2018/043224 filed Jul. 23, 2018, the disclosure of which is hereby incorporated by reference in its entirety.

BACKGROUND

Technical Field

Disclosed embodiments relate generally to merchant data-breach detection and response, and in some non-limiting embodiments or aspects, to a system, method, and computer program product for early detection of and response to a merchant data breach through machine-learning analysis.

Technical Considerations

Merchant data breach detection is usually a manual process that requires an investigator to trace down a common point of purchase by referencing incidents of fraud reported by cardholders. Breaches are much rarer than individual instances of fraudulent transaction activity. Fraudulent transaction activity may consist of independently isolated events that are not due to a data breach. The process of merchant breach detection is complex and time-consuming, and there is a time loss associated with waiting for consumers to report fraud and then using the reported fraud data to identify the source of breach. The longer it takes to detect a merchant breach event, the more financial devices and accounts are affected, which increases merchant liability, increases the number of devices that must be deactivated and/or reissued, an increases the time to resolving the breach event. Furthermore, for each security process that requires manual review and initiation, there is lost time and inefficiency in stopping the fraudulent behavior and notifying the parties involved.

There is a need in the art for computer-driven, machine-learning systems and methods to quickly and efficiently detect merchant breaches. There is a need in the art for such machine-learning systems to be integrated with processes for preventative measures, such as automatic notifications of breach events and/or seizing of accounts that are associated with fraudulent activity.

SUMMARY

Accordingly, and generally, provided is an improved system, computer-implemented method, and computer program product for early detection of and response to a merchant data breach through machine-learning analysis. Preferably, provided is a system, computer-implemented method, and computer program product for receiving transaction data, receiving fraudulent transaction data, and generating a first model input dataset and a second model input dataset. Preferably, provided is a system, computer-implemented method, and computer program product for training, based at least partly on a comparison of the first model input dataset to the second model input dataset, at least one machine-learning prediction model to associate merchants with a likelihood of data breach. Preferably, provided is a system, computer-implemented method, and computer program product for determining at least one breached merchant and generating a communication configured to cause at least one action to be taken in response to the determination of the at least one breached merchant.

According to non-limiting embodiments or aspects, provided is a computer-implemented method for early detection of and response to a merchant data breach through machine-learning analysis. The method includes receiving, with at least one processor, transaction data associated with a plurality of transactions between at least one financial device holder and at least one merchant in an electronic payment processing network. The transaction data includes, for each transaction of the plurality of transactions, an authorization request, a portable financial device identifier, and at least one of the following: transaction amount, transaction time, transaction type, merchant identifier, merchant type, or any combination thereof. The method also includes receiving, with at least one processor, fraudulent transaction data representative of at least one previously identified data-breach incident. The method further includes generating, with at least one processor and based at least partly on the transaction data and the fraudulent transaction data, a first model input dataset associated with the at least one merchant and a second model input dataset associated with at least one merchant of the at least one previously identified data-breach incident. The method further includes training, with at least one processor and based at least partly on a comparison of the first model input dataset to the second model input dataset, at least one machine-learning prediction model to associate merchants with a likelihood of data breach. The method further includes determining, with at least one processor and based at least partly on the authorization requests of the transaction data and at least partly on an output of the at least one machine-learning prediction model, at least one breached merchant of the at least one merchant. The method further includes generating, with at least one processor, a communication configured to cause at least one action to be taken in response to the determination of the at least one breached merchant. The at least one action includes at least one of the following: communicating a message to at least one user to alert the at least one user of the at least one breached merchant; deactivating at least one portable financial device used for at least one prior transaction with the at least one breached merchant; or any combination thereof.

In non-limiting embodiments or aspects, the method may include determining, with at least one processor and based at least partly on the portable financial device identifiers of the transaction data, the at least one portable financial device associated with the at least one prior transaction with the at least one breached merchant. The at least one action may include deactivating the at least one portable financial device associated with the at least one prior transaction. The at least one portable financial device may include a plurality of portable financial devices, and the at least one financial device holder may include a plurality of financial device holders. The method may further include communicating, with at least one processor, a message to each financial device holder of the at least one financial device holder, the message being automatically generated and including at least part of the transaction data for a respective transaction of the financial device holder. The message may also include a prompt for the financial device holder to authorize a chargeback request for at least one transaction with the at least one portable financial device used for at least one prior transaction with the at least one breached merchant.

In non-limiting embodiments or aspects, the at least one machine-learning prediction model may include a first machine-learning prediction model and a second machine-learning prediction model that is a different type from the first machine-learning prediction model. A merchant of the at least one breached merchant may be determined to be breached if either the first machine-learning prediction model or the second machine-learning prediction model identify the merchant as more likely than not to have been breached. A merchant of the at least one breached merchant may be determined to be breached if both the first machine-learning prediction model and the second machine-learning prediction model identify the merchant as more likely than not to have been breached. The first machine-learning prediction model may be a fully connected neural network, and the second machine-learning prediction model may be a gradient boosted decision tree.

In non-limiting embodiments or aspects, the at least one action may include communicating a message to the at least one user to alert the at least one user of the at least one breached merchant. The message may include a warning notification configured to be visually represented on a display device for the at least one user to take further preventative action. The at least one merchant may include a plurality of merchants, and the method may include storing, with at least one processor and in a merchant profile database, correspondence information for a point-of-contact for each of the plurality of merchants. The at least one user may include at least one point-of-contact of the plurality of merchants.

According to non-limiting embodiments or aspects, provided is a system for early detection of and response to a merchant data breach through machine-learning analysis. The system includes at least one server computer including at least one processor. The at least one server computer is programmed and/or configured to receive transaction data associated with a plurality of transactions between at least one financial device holder and at least one merchant in an electronic payment processing network. The transaction data includes, for each transaction of the plurality of transactions, an authorization request, a portable financial device identifier, and at least one of the following: transaction amount, transaction time, transaction type, merchant identifier, merchant type, or any combination thereof. The at least one server computer is also programmed and/or configured to receive fraudulent transaction data representative of at least one previously identified data-breach incident. The at least one server computer is further programmed and/or configured to generate, based at least partly on the transaction data and the fraudulent transaction data, a first model input dataset associated with the at least one merchant and a second model input dataset associated with at least one merchant of the at least one previously identified data-breach incident. The at least one server computer is further programmed and/or configured to train, based at least partly on a comparison of the first model input dataset to the second model input dataset, at least one machine-learning prediction model to associate merchants with a likelihood of data breach. The at least one server computer is further programmed and/or configured to determine, based at least partly on the authorization requests of the transaction data and at least partly on an output of the at least one machine-learning prediction model, at least one breached merchant of the at least one merchant. The at least one server computer is programmed and/or configured to generate a communication configured to cause at least one action to be taken in response to the determination of the at least one breached merchant, the at least one action including at least one of the following: communicating a message to at least one user to alert the at least one user of the at least one breached merchant; deactivating at least one portable financial device used for at least one prior transaction with the at least one breached merchant; or any combination thereof.

In non-limiting embodiments or aspects, the at least one server computer may be programmed and/or configured to determine, based at least partly on the portable financial device identifiers of the transaction data, the at least one portable financial device associated with the at least one prior transaction with the at least one breached merchant. The at least one action may include deactivating the at least one portable financial device associated with the at least one prior transaction. The at least one portable financial device may include a plurality of portable financial devices, and the at least one financial device holder may include a plurality of financial device holders. The at least one server computer may be further programmed and/or configured to communicate a message to each financial device holder of the at least one financial device holder, the message being automatically generated and including at least part of the transaction data for a respective transaction of the financial device holder. The message may further include a prompt for the financial device holder to authorize a chargeback request for at least one transaction with the at least one portable financial device used for at least one prior transaction with the at least one breached merchant.

In non-limiting embodiments or aspects, the at least one machine-learning prediction model may include a first machine-learning prediction model and a second machine-learning prediction model that is a different type from the first machine-learning prediction model. A merchant of the at least one breached merchant may be determined to be breached if either the first machine-learning prediction model or the second machine-learning prediction model identify the merchant as more likely than not to have been breached. A merchant of the at least one breached merchant may be determined to be breached if both the first machine-learning prediction model and the second machine-learning prediction model identify the merchant as more likely than not to have been breached. The first machine-learning prediction model may be a fully connected neural network, and the second machine-learning prediction model may be a gradient boosted decision tree.

In non-limiting embodiments or aspects, the at least one action may include communicating a message to the at least one user to alert the at least one user of the at least one breached merchant, the message including a warning notification configured to be visually represented on a display device for the at least one user to take further preventative action. The at least one merchant may include a plurality of merchants, and the at least one server computer may be further programmed and/or configured to store, in a merchant profile database, correspondence information for a point-of-contact for each of the plurality of merchants. The at least one user may include at least one point-of-contact of the plurality of merchants.

According to non-limiting embodiments or aspects, provided is a computer program product for early detection of and response to a merchant data breach through machine-learning analysis. The computer program product includes at least one non-transitory computer-readable medium including program instructions that, when executed by at least one processor, cause the at least one processor to receive transaction data associated with a plurality of transactions between at least one financial device holder and at least one merchant in an electronic payment processing network. The transaction data includes, for each transaction of the plurality of transactions, an authorization request, a portable financial device identifier, and at least one of the following: transaction amount, transaction time, transaction type, merchant identifier, merchant type, or any combination thereof. The program instructions also cause the at least one processor to receive fraudulent transaction data representative of at least one previously identified data-breach incident. The program instructions further cause the at least one processor to generate, based at least partly on the transaction data and the fraudulent transaction data, a first model input dataset associated with the at least one merchant and a second model input dataset associated with at least one merchant of the at least one previously identified data-breach incident. The program instructions further cause the at least one processor to train, based at least partly on a comparison of the first model input dataset to the second model input dataset, at least one machine-learning prediction model to associate merchants with a likelihood of data breach. The program instructions further cause the at least one processor to determine, based at least partly on the authorization requests of the transaction data and at least partly on an output of the at least one machine-learning prediction model, at least one breached merchant of the at least one merchant. The program instructions further cause the at least one processor to generate a communication configured to cause at least one action to be taken in response to the determination of the at least one breached merchant. The at least one action includes at least one of the following: communicating a message to at least one user to alert the at least one user of the at least one breached merchant; deactivating at least one portable financial device used for at least one prior transaction with the at least one breached merchant; or any combination thereof.

In non-limiting embodiments or aspects, the program instructions may cause the at least one processor to determine, based at least partly on the portable financial device identifiers of the transaction data, the at least one portable financial device associated with the at least one prior transaction with the at least one breached merchant. The at least one action may include deactivating the at least one portable financial device associated with the at least one prior transaction. The at least one portable financial device may include a plurality of portable financial devices, and the at least one financial device holder may include a plurality of financial device holders. The program instructions may further cause the at least one processor to communicate a message to each financial device holder of the at least one financial device holder, the message being automatically generated and including at least part of the transaction data for a respective transaction of the financial device holder. The message may further include a prompt for the financial device holder to authorize a chargeback request for at least one transaction with the at least one portable financial device used for at least one prior transaction with the at least one breached merchant.

In non-limiting embodiments or aspects, the at least one machine-learning prediction model may include a first machine-learning prediction model and a second machine-learning prediction model that is a different type from the first machine-learning prediction model. A merchant of the at least one breached merchant may be determined to be breached if either the first machine-learning prediction model or the second machine-learning prediction model identify the merchant as more likely than not to have been breached. A merchant of the at least one breached merchant may be determined to be breached if both the first machine-learning prediction model and the second machine-learning prediction model identify the merchant as more likely than not to have been breached. The first machine-learning prediction model may be a fully connected neural network, and the second machine-learning prediction model may be a gradient boosted decision tree.

In non-limiting embodiments or aspects, the at least one action may include communicating a message to the at least one user to alert the at least one user of the at least one breached merchant. The message may include a warning notification configured to be visually represented on a display device for the at least one user to take further preventative action. The at least one merchant may include a plurality of merchants, and the program instructions may further cause the at least one processor to store, in a merchant profile database, correspondence information for a point-of-contact for each of the plurality of merchants. The at least one user may include at least one point-of-contact of the plurality of merchants.

Further non-limiting embodiments or aspects of the present disclosure will be set forth in the following numbered clauses:

Clause 1: A computer-implemented method for early detection of and response to a merchant data breach through machine-learning analysis, the method comprising: receiving, with at least one processor, transaction data associated with a plurality of transactions between at least one financial device holder and at least one merchant in an electronic payment processing network, the transaction data comprising, for each transaction of the plurality of transactions, an authorization request, a portable financial device identifier, and at least one of the following: transaction amount, transaction time, transaction type, merchant identifier, merchant type, or any combination thereof; receiving, with at least one processor, fraudulent transaction data representative of at least one previously identified data-breach incident; generating, with at least one processor and based at least partly on the transaction data and the fraudulent transaction data, a first model input dataset associated with the at least one merchant and a second model input dataset associated with at least one merchant of the at least one previously identified data-breach incident; training, with at least one processor and based at least partly on a comparison of the first model input dataset to the second model input dataset, at least one machine-learning prediction model to associate merchants with a likelihood of data breach; determining, with at least one processor and based at least partly on the authorization requests of the transaction data and at least partly on an output of the at least one machine-learning prediction model, at least one breached merchant of the at least one merchant; generating, with at least one processor, a communication configured to cause at least one action to be taken in response to the determination of the at least one breached merchant, the at least one action comprising at least one of the following: communicating a message to at least one user to alert the at least one user of the at least one breached merchant; deactivating at least one portable financial device used for at least one prior transaction with the at least one breached merchant; or any combination thereof.

Clause 2: The computer-implemented method of clause 1, further comprising determining, with at least one processor and based at least partly on the portable financial device identifiers of the transaction data, the at least one portable financial device associated with the at least one prior transaction with the at least one breached merchant, wherein the at least one action comprises deactivating the at least one portable financial device associated with the at least one prior transaction.

Clause 3: The computer-implemented method of clause 1 or 2, wherein the at least one portable financial device comprises a plurality of portable financial devices, and the at least one financial device holder comprises a plurality of financial device holders.

Clause 4: The computer-implemented method of any of clauses 1-3, further comprising communicating, with at least one processor, a message to each financial device holder of the at least one financial device holder, the message being automatically generated and comprising at least part of the transaction data for a respective transaction of the financial device holder, and the message further comprising a prompt for the financial device holder to authorize a chargeback request for at least one transaction with the at least one portable financial device used for at least one prior transaction with the at least one breached merchant.

Clause 5: The computer-implemented method of any of clauses 1-4, wherein the at least one machine-learning prediction model comprises a first machine-learning prediction model and a second machine-learning prediction model that is a different type from the first machine-learning prediction model.

Clause 6: The computer-implemented method of any of clauses 1-5, wherein a merchant of the at least one breached merchant is determined to be breached if either the first machine-learning prediction model or the second machine-learning prediction model identify the merchant as more likely than not to have been breached.

Clause 7: The computer-implemented method of any of clauses 1-6, wherein a merchant of the at least one breached merchant is determined to be breached if both the first machine-learning prediction model and the second machine-learning prediction model identify the merchant as more likely than not to have been breached.

Clause 8: The computer-implemented method of any of clauses 1-7, wherein the first machine-learning prediction model is a fully connected neural network, and the second machine-learning prediction model is a gradient boosted decision tree.

Clause 9: The computer-implemented method of any of clauses 1-8, wherein the at least one action comprises communicating a message to the at least one user to alert the at least one user of the at least one breached merchant, the message comprising a warning notification configured to be visually represented on a display device for the at least one user to take further preventative action.

Clause 10: The computer-implemented method of any of clauses 1-9, wherein the at least one merchant comprises a plurality of merchants, and the method further comprises storing, with at least one processor and in a merchant profile database, correspondence information for a point-of-contact for each of the plurality of merchants, wherein the at least one user comprises at least one point-of-contact of the plurality of merchants.

Clause 11: A system for early detection of and response to a merchant data breach through machine-learning analysis, the system comprising at least one server computer including at least one processor, the at least one server computer programmed and/or configured to: receive transaction data associated with a plurality of transactions between at least one financial device holder and at least one merchant in an electronic payment processing network, the transaction data comprising, for each transaction of the plurality of transactions, an authorization request, a portable financial device identifier, and at least one of the following: transaction amount, transaction time, transaction type, merchant identifier, merchant type, or any combination thereof; receive fraudulent transaction data representative of at least one previously identified data-breach incident; generate, based at least partly on the transaction data and the fraudulent transaction data, a first model input dataset associated with the at least one merchant and a second model input dataset associated with at least one merchant of the at least one previously identified data-breach incident; train, based at least partly on a comparison of the first model input dataset to the second model input dataset, at least one machine-learning prediction model to associate merchants with a likelihood of data breach; determine, based at least partly on the authorization requests of the transaction data and at least partly on an output of the at least one machine-learning prediction model, at least one breached merchant of the at least one merchant; generate a communication configured to cause at least one action to be taken in response to the determination of the at least one breached merchant, the at least one action comprising at least one of the following: communicating a message to at least one user to alert the at least one user of the at least one breached merchant; deactivating at least one portable financial device used for at least one prior transaction with the at least one breached merchant; or any combination thereof.

Clause 12: The system of clause 11, wherein the at least one server computer is further programmed and/or configured to determine, based at least partly on the portable financial device identifiers of the transaction data, the at least one portable financial device associated with the at least one prior transaction with the at least one breached merchant, wherein the at least one action comprises deactivating the at least one portable financial device associated with the at least one prior transaction.

Clause 13: The system of clause 11 or 12, wherein the at least one portable financial device comprises a plurality of portable financial devices, and the at least one financial device holder comprises a plurality of financial device holders.

Clause 14: The system of any of clauses 11-13, wherein the at least one server computer is further programmed and/or configured to communicate a message to each financial device holder of the at least one financial device holder, the message being automatically generated and comprising at least part of the transaction data for a respective transaction of the financial device holder, and the message further comprising a prompt for the financial device holder to authorize a chargeback request for at least one transaction with the at least one portable financial device used for at least one prior transaction with the at least one breached merchant.

Clause 15: The system of any of clauses 11-14, wherein the at least one machine-learning prediction model comprises a first machine-learning prediction model and a second machine-learning prediction model that is a different type from the first machine-learning prediction model.

Clause 16: The system of any of clauses 11-15, wherein a merchant of the at least one breached merchant is determined to be breached if either the first machine-learning prediction model or the second machine-learning prediction model identify the merchant as more likely than not to have been breached.

Clause 17: The system of any of clauses 11-16, wherein a merchant of the at least one breached merchant is determined to be breached if both the first machine-learning prediction model and the second machine-learning prediction model identify the merchant as more likely than not to have been breached.

Clause 18: The system of any of clauses 11-17, wherein the first machine-learning prediction model is a fully connected neural network, and the second machine-learning prediction model is a gradient boosted decision tree.

Clause 19: The system of any of clauses 11-18, wherein the at least one action comprises communicating a message to the at least one user to alert the at least one user of the at least one breached merchant, the message comprising a warning notification configured to be visually represented on a display device for the at least one user to take further preventative action.

Clause 20: The system of any of clauses 11-19, wherein the at least one merchant comprises a plurality of merchants, and the at least one server computer is further programmed and/or configured to store, in a merchant profile database, correspondence information for a point-of-contact for each of the plurality of merchants, wherein the at least one user comprises at least one point-of-contact of the plurality of merchants.

Clause 21: A computer program product for early detection of and response to a merchant data breach through machine-learning analysis, the computer program product comprising at least one non-transitory computer-readable medium including program instructions that, when executed by at least one processor, cause the at least one processor to: receive transaction data associated with a plurality of transactions between at least one financial device holder and at least one merchant in an electronic payment processing network, the transaction data comprising, for each transaction of the plurality of transactions, an authorization request, a portable financial device identifier, and at least one of the following: transaction amount, transaction time, transaction type, merchant identifier, merchant type, or any combination thereof; receive fraudulent transaction data representative of at least one previously identified data-breach incident; generate, based at least partly on the transaction data and the fraudulent transaction data, a first model input dataset associated with the at least one merchant and a second model input dataset associated with at least one merchant of the at least one previously identified data-breach incident; train, based at least partly on a comparison of the first model input dataset to the second model input dataset, at least one machine-learning prediction model to associate merchants with a likelihood of data breach; determine, based at least partly on the authorization requests of the transaction data and at least partly on an output of the at least one machine-learning prediction model, at least one breached merchant of the at least one merchant; generate a communication configured to cause at least one action to be taken in response to the determination of the at least one breached merchant, the at least one action comprising at least one of the following: communicating a message to at least one user to alert the at least one user of the at least one breached merchant; deactivating at least one portable financial device used for at least one prior transaction with the at least one breached merchant; or any combination thereof.

Clause 22: The computer program product of clause 21, wherein the program instructions further cause the at least one processor to determine, based at least partly on the portable financial device identifiers of the transaction data, the at least one portable financial device associated with the at least one prior transaction with the at least one breached merchant, wherein the at least one action comprises deactivating the at least one portable financial device associated with the at least one prior transaction.

Clause 23: The computer program product of clause 21 or 22, wherein the at least one portable financial device comprises a plurality of portable financial devices, and the at least one financial device holder comprises a plurality of financial device holders.

Clause 24: The computer program product of any of clauses 21-23, wherein the program instructions further cause the at least one processor to communicate a message to each financial device holder of the at least one financial device holder, the message being automatically generated and comprising at least part of the transaction data for a respective transaction of the financial device holder, and the message further comprising a prompt for the financial device holder to authorize a chargeback request for at least one transaction with the at least one portable financial device used for at least one prior transaction with the at least one breached merchant.

Clause 25: The computer program product of any of clauses 21-24, wherein the at least one machine-learning prediction model comprises a first machine-learning prediction model and a second machine-learning prediction model that is a different type from the first machine-learning prediction model.

Clause 26: The computer program product of any of clauses 21-25, wherein a merchant of the at least one breached merchant is determined to be breached if either the first machine-learning prediction model or the second machine-learning prediction model identify the merchant as more likely than not to have been breached.

Clause 27: The computer program product of any of clauses 21-26, wherein a merchant of the at least one breached merchant is determined to be breached if both the first machine-learning prediction model and the second machine-learning prediction model identify the merchant as more likely than not to have been breached.

Clause 28: The computer program product of any of clauses 21-27, wherein the first machine-learning prediction model is a fully connected neural network, and the second machine-learning prediction model is a gradient boosted decision tree.

Clause 29: The computer program product of any of clauses 21-28, wherein the at least one action comprises communicating a message to the at least one user to alert the at least one user of the at least one breached merchant, the message comprising a warning notification configured to be visually represented on a display device for the at least one user to take further preventative action.

Clause 30: The computer program product of any of clauses 21-29, wherein the at least one merchant comprises a plurality of merchants, and the program instructions further cause the at least one processor to store, in a merchant profile database, correspondence information for a point-of-contact for each of the plurality of merchants, wherein the at least one user comprises at least one point-of-contact of the plurality of merchants.

These and other features and characteristics of the present disclosure, as well as the methods of operation and functions of the related elements of structures and the combination of parts and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular forms of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which.

DETAILED DESCRIPTION

Figure 1:
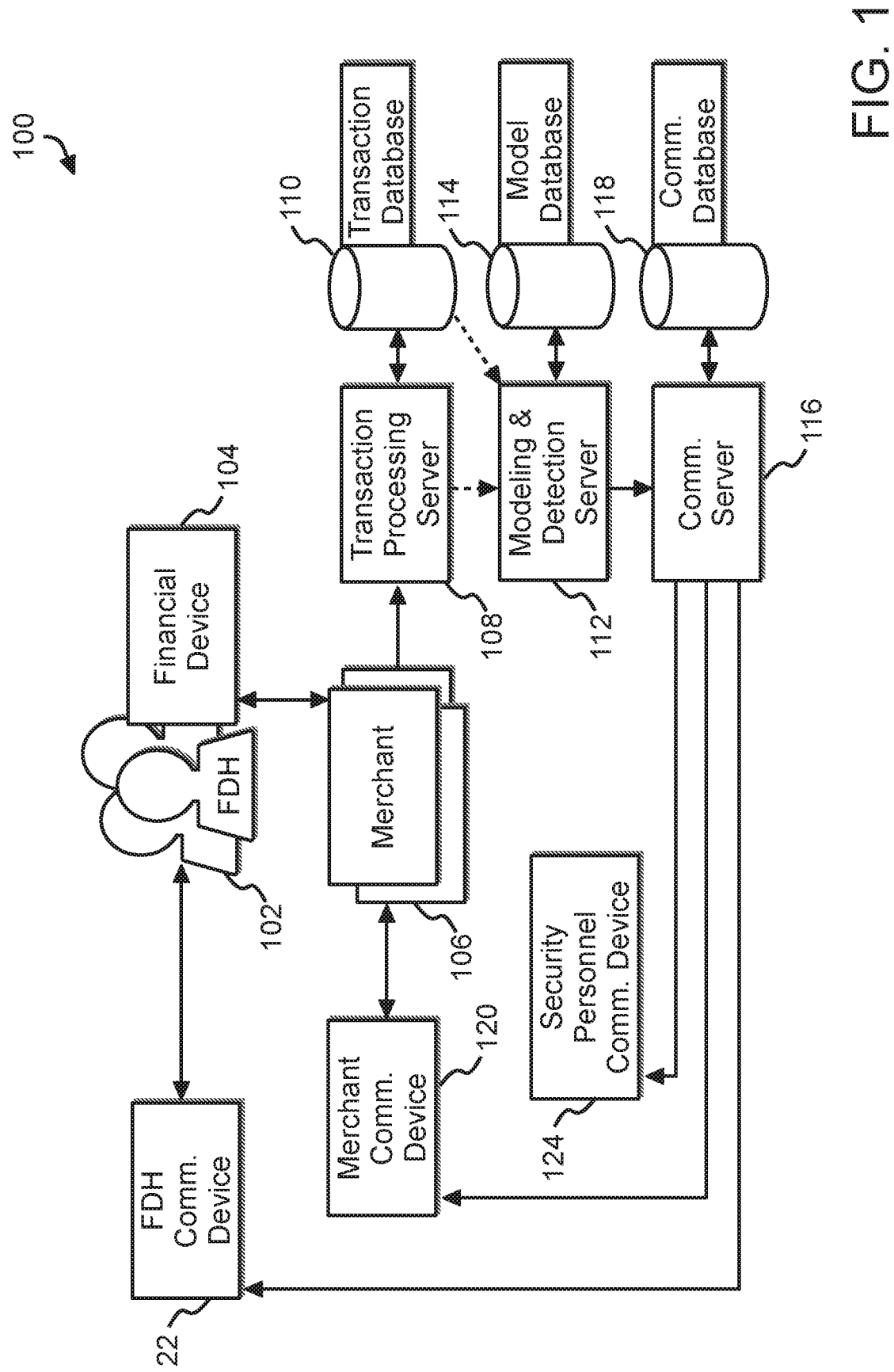
FIG. 1 is a schematic diagram of non-limiting embodiments or aspects of a system and method for early detection of and response to a merchant data breach through machine-learning analysis.

For purposes of the description hereinafter, the terms "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments disclosed herein are not to be considered as limiting. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction. Furthermore, "merchants" and "POS systems," as referred to herein, include entities and systems for facilitating both card-present and card-not-present transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "financial device" may refer to a portable payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The financial device may include a volatile or a non-volatile memory to store information, such as an account identifier or a name of the account holder. The financial device may store account credentials locally on the device, in digital or non-digital representation, or may facilitate accessing account credentials stored in a medium that is accessible by the financial device in a connected network.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The term "account data," as used herein, refers to any data concerning one or more accounts for one or more users. Account data may include, for example, one or more account identifiers, user identifiers, transaction histories, balances, credit limits, issuer institution identifiers, and/or the like.

In non-limiting embodiments or aspects of the present disclosure, described systems and methods improve over existing systems by decreasing the overall time for detection of merchant data breaches, by using fewer computer resources, and by improving the operability of the system over time. As opposed to breaches that are detected by manually grouping individual reports of fraud, described systems and methods herein use machine-learning models to detect fraudulent behavior even before financial device holders and merchants are likely aware. Early detection via a computer-driven, machine-learning system will lead to an overall reduction in fraud, particularly by automatically notifying merchants and financial device holders, and by deactivating financial devices that have been used at compromised locations. Early detection reduces the need for financial device reissue, as fewer financial devices will be used at a compromised location after the breach occurs. Furthermore, by leveraging the unique position of the transaction processing server within an electronic payment processing network, namely to intelligently interpret transaction data in real time, information across multiple merchants and multiple transactions can be pooled to provide greater efficiencies. With more data, the underlying prediction models are improved. This also provides efficient fraud detection services to smaller market participants (e.g., merchants), who are unable to police or monitor their own transactions for suspicious behavior given their small pool of data. Finally, by analyzing transaction data across multiple merchants, the confidence of predictions of fraudulent behavior is greatly improved, which improves the rest of the technical processes that depend on accurately and quickly detecting fraudulent transactions (e.g., consumer notifications, merchant notifications, card-shutdown systems, password reset processes, etc.).

With specific reference to FIG. 1, and in non-limiting embodiments or aspects of the disclosure, provided is a system 100 for early detection of and response to a merchant data breach through machine-learning analysis. The system 100 includes one or more financial device holders 102, each of whom possess one or more financial device 104. Each financial device 104 may have its own portable financial device identifier, e.g., a token, and may be associated with a PAN. Multiple financial devices 104 may be associated with the same PAN. It will be appreciated that the methods described herein can be applied to data breach-based fraud on a financial device level (by financial device identifier) or on a PAN level. In a purchase transaction environment, a financial device 104 may be used by a financial device holder 102 to complete a transaction with a merchant 106.

The transaction may be completed in person, e.g., a "card present" transaction, such as by presenting the financial device 104 at a merchant's 106 POS (e.g., inserting financial device into a reader, swiping financial device at a reader, hovering financial device near scanner, etc.). An example "card present" transaction includes buying food from a restaurant. The transaction may also be completed without the financial device holder being present at the merchant's 106 POS, e.g., a "card not present" transaction, such as by entering identifying information of the financial device 104 in an online payment interface. An example "card not present" transaction includes buying clothes from an online marketplace. Regardless of the type of transaction completed, an authorization request to complete the transaction is processed by a transaction processing server 108. The authorization request may be for a transfer of funds from an account of the financial device holder 102 to an account of the merchant 106. The account of the financial device holder 102 may be associated with an issuer processor (not shown) and the account of the merchant 106 may be associated with an acquirer processor (not shown). Transaction data associated with the transactions being processed by the transaction processing server 108 may be stored in a transaction database 110 that is communicatively connected to the transaction processing server 108. It will be appreciated that many configurations are possible.

With further reference to FIG. 1, and in non-limiting embodiments or aspects, the transaction data may be analyzed by a modeling and detection server 112. The modeling and detection server 112 may be the same server as or a different server from the transaction processing server 108. The modeling and detection server 112 may directly access the transaction data from the transaction database 110, or indirectly access the transaction data via the transaction processing server 108. The modeling and detecting server 112 may access, modify, or remove data from a model database 114. The model database 114 may be the same database as or a different database from the transaction database 110. The model database 114 may also be a distributed file system of a number of data repositories (e.g., a Hadoop Distributed File System). The modeling and detection server 112 receives a number of data sources to build model input datasets, e.g., profiles, to train machine learning prediction models. The various data sources and their use to construct model input datasets are further discussed below in relation to FIG. 2. The modeling and detection server 112 may employ one or more predictive models, e.g., machine-learning algorithms, to determine the likelihood of a given merchant having experienced a data breach event. The predictive models may be trained based on an evaluation of historic transaction data relative to known historic fraudulent activity. Once trained, feature datasets of merchant transaction activity may be input to the predictive models to determine likelihoods of merchant breach. Historic transaction data from known data breach events may be used to train the prediction models and to evaluate the performance of the prediction models, by creating test sets. It will be appreciated that many configurations are possible.

With further reference to FIG. 1, and in non-limiting embodiments or aspects, the system 100 further includes a communication server 116 for communicating with users, such as financial device holders, merchants, and security personnel (e.g., users that are responsible for reporting, resolving, and/or responding to fraudulent transaction activity, such as merchant data breaches). The communication server 116 may be the same server as or a different server from the transaction processing server 108 and/or the modeling and detection server 112. The communication server 116 may have a communicative connection to a communication database 118, which may store correspondence information for users, information of designated points-of-contact, communication templates, user communication preference settings, and/or the like. The communication database 118 may be the same database as or a different database from the transaction database 110 and/or the model database 114. Communications may be automatically generated and sent to users from the communication server 116, as triggered by the detection process or manual authorization by a security personnel. Communications may include, but are not limited to, emails, texts, phone calls, messages, interface notifications, packetized data, and/or the like. It will be appreciated that many configurations are possible.

With further reference to FIG. 1, and in non-limiting embodiments or aspects, the communication server 116 may generate and communicate an alert to a financial device holder's communication device 122, such as a mobile device, to notify the financial device holder 102 that a merchant 106 with whom they have transacted has likely experienced a data breach. This communication may include additional action options for the financial device holder 122, such as to review historic transactions, contact security personnel, cancel past transactions, freeze future transactions, request a new financial device 104, and/or the like. The alert may also be a notification that the financial device holder's 102 financial device 104 has been deactivated, e.g., suspended from engaging in financial transactions. In another non-limiting example, the communication server 116 may generate and communicate an alert to a merchant communication device 120 of a merchant 106. The merchant 106 may be one that was determined to have been breached. The merchant 106 may also be one that shares a characteristic with one that has been breached, based on merchant location, merchant type, merchant goods/services, and/or the like. The communication may include additional action options for the merchant 106, such as to review historic transactions, contact security personnel, cancel past transactions, freeze future transactions, reconfigure their point-of-sale or security settings, and/or the like. In another non-limiting example, the communication server 116 may generate and communicate an alert to a security personnel communication device 124 to take responsive action to the breach, such as trigger communications to financial device holders 102 and/or merchants 106, deactivate one or more financial devices 104, reset user passwords, analyze transaction data, and/or the like. Communications may also be transmitted to other servers/processors to take automatic protective action, such as to freeze transactions, deactivate financial devices, send further communications to users, and/or the like. It will be appreciated that various configurations are possible.

Figure 2:
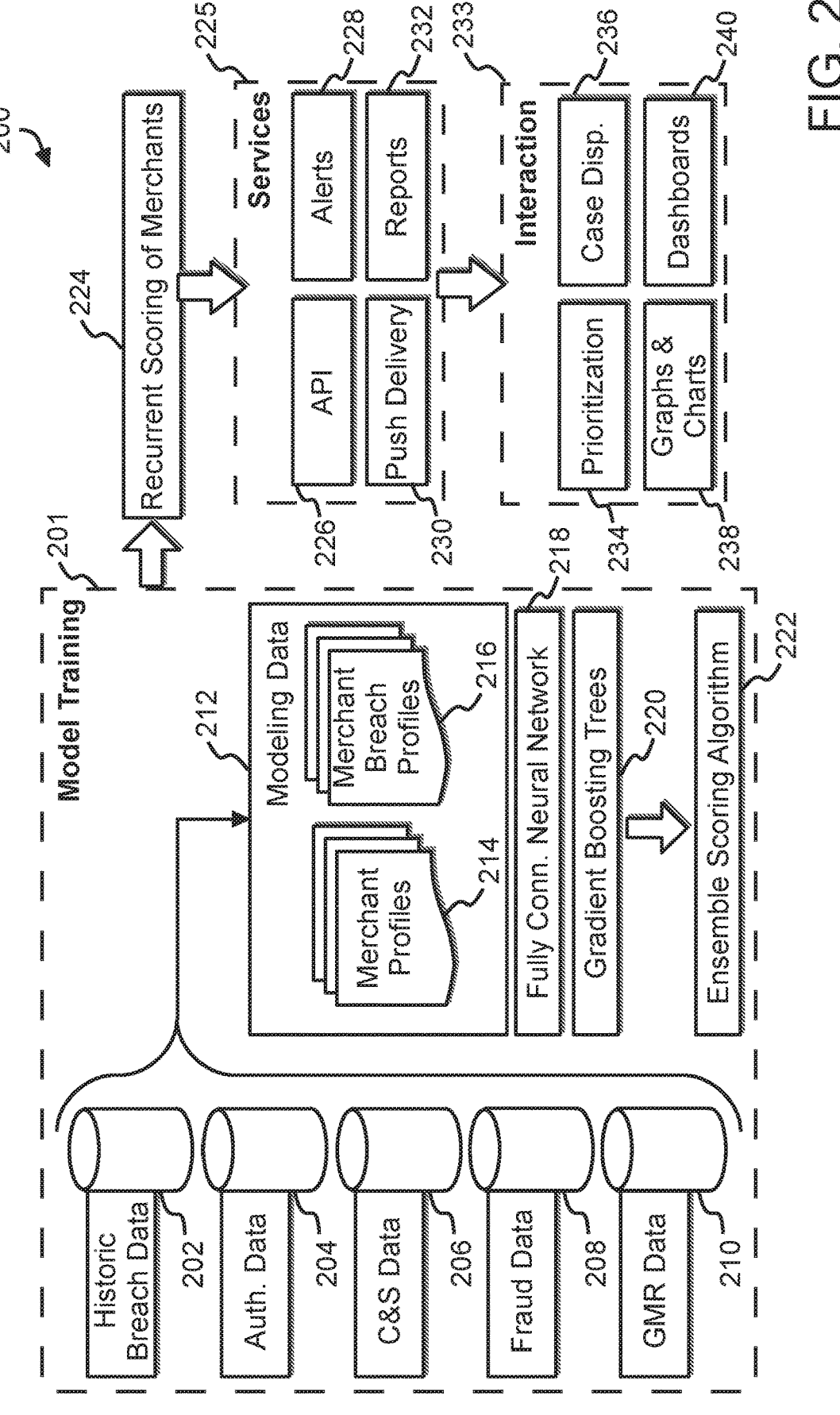
FIG. 2 is a process diagram of non-limiting embodiments or aspects of a system and method for early detection of and response to a merchant data breach through machine-learning analysis.

With specific reference to FIG. 2, and in non-limiting embodiments or aspects of the disclosure, provided is a method 200 for early detection of and response to a merchant data breach through machine-learning analysis. The method 200 includes a model training process 201, in which data from multiple data sources are used to create prediction model input feature datasets, e.g., model training profiles. Data sources include: (i) historic breach data 202, including historical support requests from issuer institutions, time periods of past breaches, financial device data of financial devices affected by past breaches, fraudulent transaction data, and/or the like; (ii) transaction authorization request data 204, including transaction type, transaction amount, transaction description, merchant identifier, merchant location, transaction time, portable financial device identifier, PAN information, automatic ratings from security systems estimating the riskiness of the transaction, and/or the like; (iii) clearing and settlement data 206, including chargeback data representative of contested transactions, acquirer institution information, issuer institution information, and/or the like; (iv) fraud report data 208, including financial device identifier(s), report date, report time, merchant identifier, transaction data, and/or the like; (v) global merchant repository data 210, including merchant data for a plurality of merchants, such as merchant name, merchant type, merchant location, merchant point-of-contact, and/or the like; and (vi) dark web data, e.g., stolen financial device data that is posted for resale on darknets. The modeling data 212, taken from the data sources, may be used to create a number of features, e.g., feature vectors, to form model input datasets, e.g., training profiles. The dataset of features for all merchants may be used as a first model input dataset, representative of the set of merchant profiles 214. The dataset of features for a subset of previously breached merchants may be used as a second model input dataset, representative of the set of merchant breach profiles 216. The merchant breach profiles may be used for training and/or testing the machine-learning prediction models. It will be appreciated that many configurations are possible.

With further reference to FIG. 2, and in non-limiting embodiments or aspects, the merchant profiles 214 and the merchant breach profiles 216 may be used, particularly by comparing the differences in features between the two input datasets 214, 216, to train one or more machine learning prediction (e.g., breach detection) models. One example and non-limiting machine learning algorithm that may be used for merchant breach detection is a fully connected deep neural network 218, such as a multilayer perceptron. Another example and non-limiting machine learning algorithm that may be used for breach detection is gradient boosting 220. Gradient boosting 220 produces a prediction model including an ensemble of weak prediction models, typically decision trees. Furthermore, the machine learning analysis and detection of merchant breach events may employ ensemble learning, which uses multiple learning algorithms to obtain better predictive performance than any of the underlying multiple learning algorithms on their own. Any two or more types of machine-learning algorithms may be ensembled. For example, a fully connected deep neural network 218 may be ensembled with gradient boosted decision trees 220 to produce an ensemble scoring algorithm 222. Once trained, the machine learning prediction models 218, 220, either individually or as an ensemble scoring algorithm 222, may be used to assign a breach score to individual merchants. An output score from the prediction models 218, 220 or the ensemble scoring algorithm 222 may be normalized between 0 and 1, or scaled between 0 and 100, as a representation of likelihood of a given merchant to be breached (e.g., a confidence score, also referred herein as a "breach score"). The ensemble scoring algorithm 222 may combine the individual scores of two or more models 218, 220 to create a new metric score. Each model 218, 220 may output a score that, when compared to a predetermined threshold value at a given false positive tolerance level, indicates whether or not a merchant has been breached. Through ensembling, a merchant may be determined to be breached if either model 218, 220 indicates the merchant was breached. Alternatively, a merchant may be determined to be breached if both models 218, 220 indicate the merchant was breached. In non-limiting embodiments or aspects, the combined score of both models may be compared to a composite threshold, which may indicate whether or not a merchant has been breached.

With further reference to FIG. 2, and in non-limiting embodiments or aspects, merchants may be recurrently scored 224 based on the models 218, 220 and/or the ensemble scoring algorithm. The generated scores may be used for, and individually trigger, a number of computer-driven services 225 for resolving merchant breach. For example, the scores may be communicated through an application programming interface (API) 226 to a security personnel that is tasked with alerting merchants, contacting financial device holders, taking protective actions, and/or the like. For example, the API may be used to display a breach investigation platform that visually represents the merchants (e.g., in a sortable table) with respect to case status, merchant region, detection date, merchant level, merchant type, predictive model breach score, breach date, total number of PANs associated with transactions with the merchant in a prior time period (e.g., 180 days), number of PANs associated with fraudulent transactions, percent of PANs affected by fraud, and total number of PANs affected by merchant breach. The scores may also be used for automated alerts 228, such as notifications on computer interfaces for financial device holders, merchants, or security personnel. The scores may also be used in push delivery services 230, such as through automated calls, messages, SMS, emails, and/or the like, to notify financial device holders, merchants, or security personnel. The scores may further be used in reporting services 232, such as in statements generated and communicated to financial device holders or merchants to inform them of detected fraudulent activity and the measures taken to address the security breaches. It will be appreciated that many configurations are possible.

With further reference to FIG. 2, and in non-limiting embodiments or aspects, the services 225 may be integrated with additional features for user interaction 233. For example, merchant scores and other metrics of data breaches may be sorted/filtered in display interfaces for users (e.g., security personnel), to facilitate prioritization 234 of cases of merchant breach. When assigned to a security personnel, the scores may be integrated with case disposition 236 systems, such as an issue ticketing and resolution system. The scores may also be incorporated into any number of graphs and charts 238, to represent various metrics including, but not limited to, fraud risk of a merchant over time, number of financial device declines over time, number of financial device declines that are indicative of fraud over time, number of financial devices with security testing transaction activity, days since breach occurred and/or was detected, estimated value of fraudulent transaction activity, ratio/percentage of PANs exhibiting fraudulent behavior (see FIG. 4 for a more detailed description), and/or the like. The scores may further be incorporated into dashboard-style displays 240, or more generally any interface where users may view detected merchant breaches and take responsive action. It will be appreciated that many configurations are possible.

Figure 3:
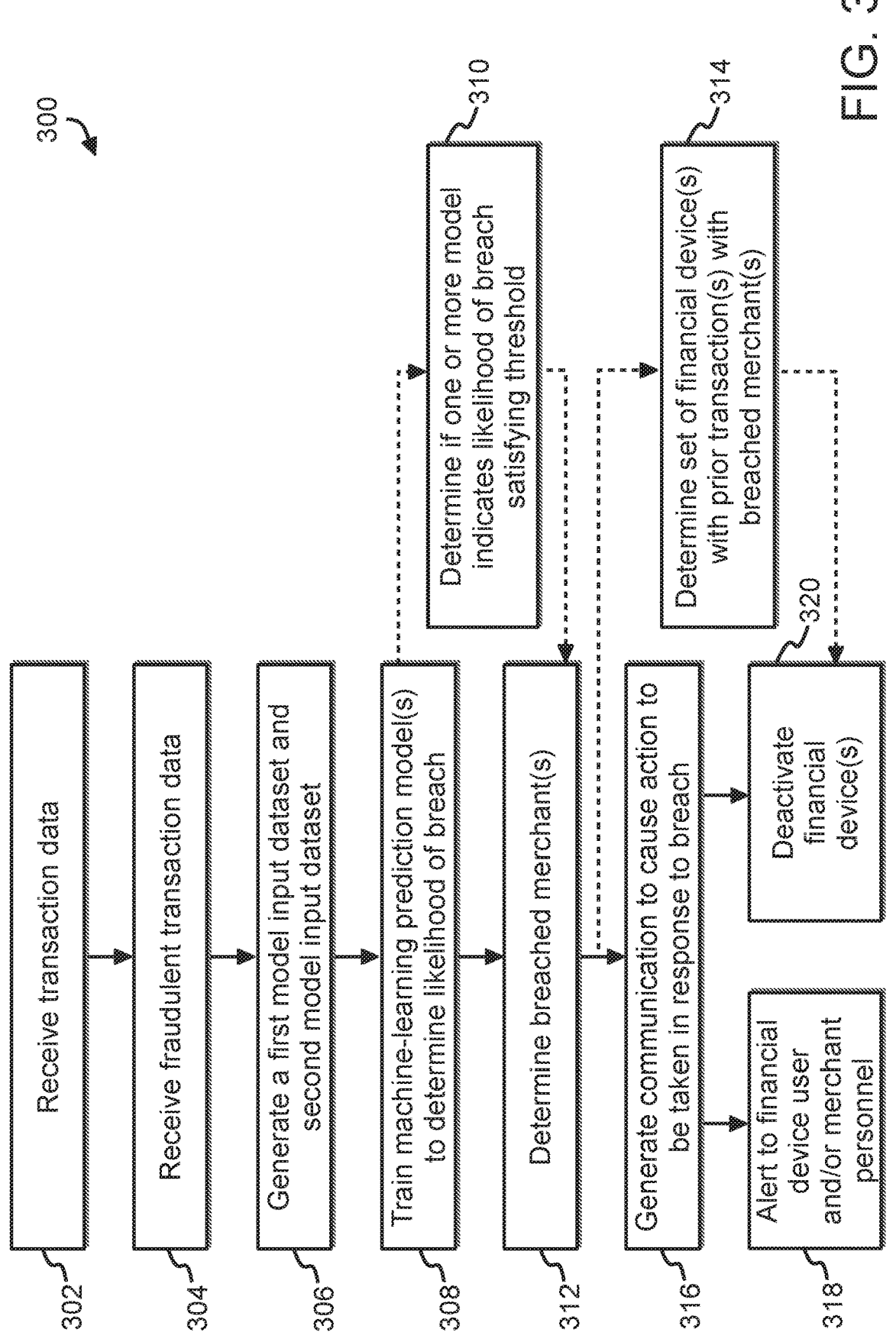
FIG. 3 is a flow diagram of non-limiting embodiments or aspects of a system and method for early detection of and response to a merchant data breach through machine-learning analysis.

With specific reference to FIG. 3, and in non-limiting embodiments or aspects of the disclosure, provided is a method 300 for early detection of and response to a merchant data breach through machine-learning analysis. The method 300 may be executed by one or more servers, each having one or more processors. The method 300 includes receiving transaction data associated with a plurality of transactions between one or more financial device holders and one or more merchants in step 302. The transactions may be those occurring in an electronic payment processing network, in which case the transactions may be processed via authorization requests at a transaction processing server. The transaction data may be stored in a transaction database and used for further fraud analysis. The method 300 also includes receiving fraudulent transaction data representative of one or more previously identified data-breach incidents, in step 304. For example, if a data breach was self-reported by a merchant, the fraudulent transaction data may include transaction data associated with transactions for the reporting merchant that occurred around and/or after the time of data breach. Moreover, if the data breach was previously detected by the system's data breach detection models, transactions associated with one or more detected breaches may be used as a baseline for future breach determinations. In this manner, the predictive models can continuously be improved to provide more efficient and accurate determinations of data breach. Both the transaction data and fraudulent transaction data may be stored for comparison and further analysis. It will be appreciated that many configurations are possible.

With further reference to FIG. 3, and in non-limiting embodiments or aspects, the method 300 includes generating, based at least partly on the transaction data and the fraudulent transaction data, a first model input dataset and a second model input dataset in step 306. The first model input dataset may be associated with one or more merchants involved in transactions for which transaction data has been received. The second model input dataset may be associated with one or more merchants associated with one or more previous data-breach incidents. This dataset may be used as a comparison to the first model input dataset for the detection models. Because the second model input dataset includes transaction data associated with one or more breach incidents, the patterns and metrics associated with fraud can be determined and applied to the first model input dataset to detect fraud. At least partly based on the comparison of the two datasets, one or more machine-learning prediction models can be trained in step 308. The machine-learning prediction models may be then employed to determine a likelihood of breach of each analyzed merchant in step 310. More than one machine-learning prediction model may be used, to improve the accuracy of data breach detection. Different types of machine-learning algorithms may be used. A first machine-learning prediction model may include a fully connected neural network. A second machine-learning prediction model may include a gradient boosted decision tree. It will be appreciated that various configurations are possible.

With further reference to FIG. 3, and in non-limiting embodiments or aspects, the method 300 includes determining one or more merchants that have likely been breached in step 312. For example, if any one prediction model indicates that a merchant has been breached, then the merchant may be determined to have been breached (e.g., an "OR" evaluation). Alternatively, if more than one or all of the prediction models indicate that a merchant has been breached, then the merchant may be determined to have been breached (e.g., an "AND" evaluation). Each machine-learning prediction model that is employed may be compared against its own model-specific threshold, indicative of a likelihood of breach, and may be ensembled with another model type to create a combined breach likelihood score. For responsive actions that require a determination of the financial devices that have been used at a data-breached merchant, the method 300 includes determining the set of one or more financial devices that have been used to transact with the breached merchant for one or more transactions, before, during, and/or after the detected breach event in step 314. The method 300 further includes, in response to the determination of one or more breached merchants, generating one or more communications configured to cause responsive actions to be taken, in step 316. The communication may be a message to a user to alert the user about the merchant breach in step 318. The user may be a financial device holder, a merchant, a security personnel, and/or the like. For alerts sent to financial device holders, the communication may include a prompt for the financial device holder to authorize a chargeback request for a transaction made with a portable financial device used to complete one or more prior transactions with a breached merchant. For alerts sent to merchants, the communication may include a prompt to lock-down transactions, change security settings, notify customers, and/or the like. For alerts sent to security personnel, the communication may include a warning notification in a display device interface, to prompt and provide for the security personnel to take preventative action, such as contact merchants, contact financial device holders, deactivate financial devices, issue new financial devices, change security settings, and/or the like. The communication may include a trigger to deactivate one or more financial devices that were determined to have been used to transact with the breached merchant in step 320. It will be appreciated that many configurations are possible.

Figure 4:
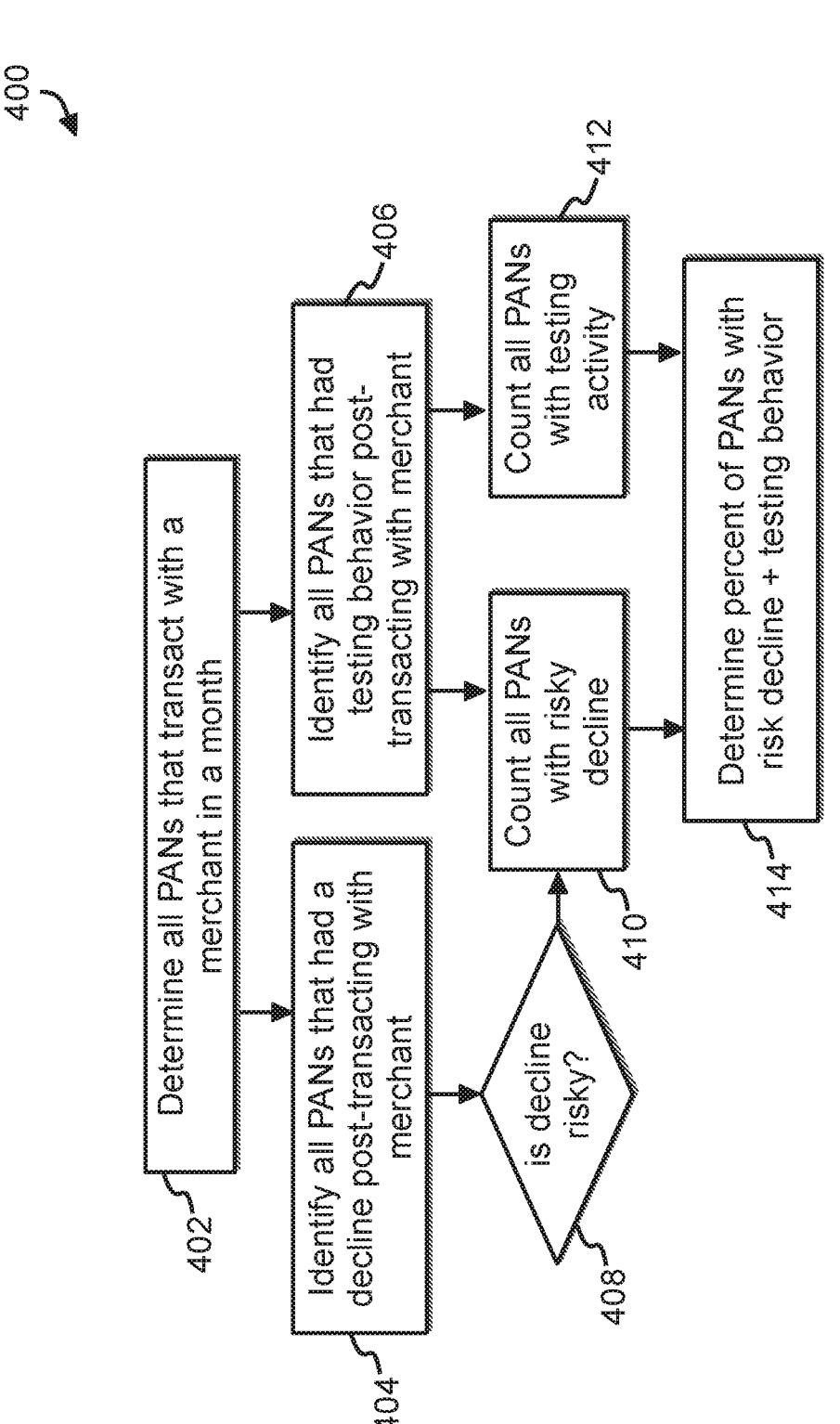
FIG. 4 is a flow diagram of non-limiting embodiments or aspects of a system and method for early detection of and response to a merchant data breach through machine-learning analysis.

With specific reference to FIG. 4, and in non-limiting embodiments or aspects of the disclosure, provided is a method of analysis 400 for early detection of and response to a merchant data breach through machine-learning analysis. The method 400 may be executed by one or more servers, each having one or more processors. The metrics produced by this method 400 may be used as feature variable inputs into the prediction models (for model training), or to determine the scope of a merchant data breach and to validate the prediction models. The method 400 includes determining all PANs that transacted with a merchant in a month in step 402. The method 400 includes identifying, from the set of all PANs, all PANs that had a declined transaction after transacting with the subject merchant, in step 404. In step 408, the method 400 includes determining which of those declined transactions are risky. A sub-model may be used for the determination of which declined transactions are risky. The number of PANs with risky declines may then be counted (e.g., determined as a set) in step 410. Independent of determining risky declines, the method 400 may include identifying all PANs that exhibited testing behavior after transacting with the breached merchant, in step 406. Testing behavior may include, but is not limited to, one or more transactions by a fraudulent actor to see if misappropriated financial device data can be used, and if so, how the financial device may be used and how much can be purchased. The number of all PANs with testing activity may be counted (e.g., determined as a set) in step 412. A sub-model may be used for the determination of which PANs had transactions constituting testing behavior.

With further reference to FIG. 4, and in non-limiting embodiments or aspects, the sets of PANs with risky declines and/or testing activity may be used to generate additional metrics for analysis. Based on the determinations of the number of PANs with risky declines, in step 410, and the number of PANs with testing behavior, in step 412, percentages/ratios of risky behavior and/or testing behavior may be calculated in step 414. For example, the percent/ratio of all PANs with risky declines may be calculated. Alternatively, the percent/ratio of all PANs with testing activity may be calculated. In further examples, the set of PANs with risky declines and the set of PANs with testing activity may be combined, to constitute a set of PANs with fraudulent transaction behavior, to calculate a percent/ratio of all PANs with fraudulent transaction behavior. These percentages/ratios can be displayed graphically for a user to view trends in transactions, to verify detected merchant breaches (see FIG. 5 for further description). For example, the percent/ratio of all PANs with fraudulent transaction behavior may be displayed as points on a line graph over time, such as month-over-month, to observe how these ratios/percentages change over time. It may be assumed that data breaches would greatly increase the number of risky declines and/or testing activity. As such, spikes in such a line graph may be tive of data breach(es) around that time period. It will be appreciated that fraudulent transactions may be further broken down and depicted by transactions having risky declines, chargebacks, and/or the like. This graph is illustrative of the methods that may be used to verify the prediction models, and also the metrics that may be used as feature variable inputs into the machine-learning algorithms. It will be appreciated that various configurations are possible.

With further reference to the foregoing figures, and specific reference to the below table, provided is a non-limiting illustrative example of the output of the machine-learning prediction models.

TABLE 1

| Merchant Name | Detect Date | BS | Breach Date | #PANs (180 days) | Fraud PANs (#) | Fraud % | PANS Affected (#) |
|---|---|---|---|---|---|---|---|
| Clothing Vendor | May 15, 2018 | 86 | Sep. 13, 2017 | 18,025 | 993 | 5.51 | 23,616 |
| Sporting Goods | May 15, 2018 | 86 | Aug. 16, 2017 | 25,950 | 1,666 | 6.42 | 37,278 |
| Wellness Store | May 15, 2018 | 84 | Sep. 20, 2017 | 13,224 | 993 | 7.51 | 14,563 |
| Travel Website | May 15, 2018 | 98 | Oct. 25, 2017 | 11,738 | 2,266 | 19.30 | 11,460 |
| Craft Supplier | May 15, 2018 | 75 | Sep. 27, 2017 | 26,358 | 865 | 3.28 | 29,665 |
| Game Store | May 15, 2018 | 70 | Apr. 11, 2017 | 11,831 | 379 | 3.20 | 6,660 |
| Food Supplier | May 15, 2018 | 94 | Sep. 13, 2017 | 14,178 | 1,648 | 11.62 | 25,209 | a verifier of detected breaches. It may also indicate, by machine-learning and the prediction model itself, that a breach has occurred. It will be appreciated that various configurations are possible.

Figure 5:
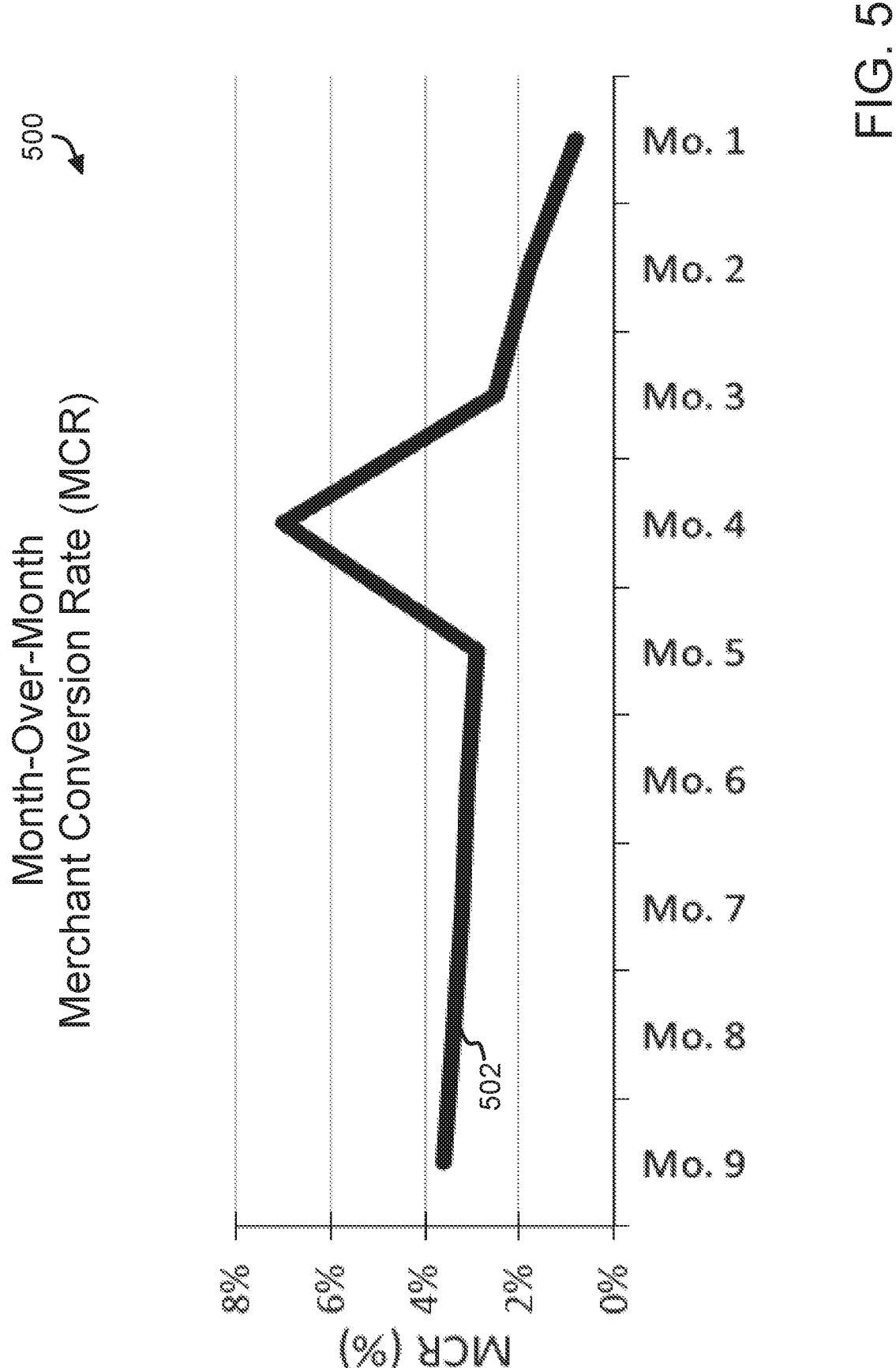
FIG. 5 is a data visualization of non-limiting embodiments or aspects of a system and method for early detection of and response to a merchant data breach through machine-learning analysis.

With specific reference to FIG. 5, and in non-limiting embodiments or aspects of the disclosure, provided is a data visualization 500 for a system for early detection of and response to a merchant data breach through machine-learning analysis. Depicted is an illustrative line graph of month-over-month merchant conversion rate (MCR), e.g., the percentage of cards that transacted with merchants in a particular month and were engaged in fraudulent transaction activity subsequent to transacting with those merchants. A plot 502 is shown indicating merchant conversion rate over time, corresponding to the values on the left-hand y-axis. Fraudulent transactions may be defined as transactions for PANs that have been noted to have risky declines, testing behavior, reported fraud, and/or other indicators or signs of fraud. The x-axis shows time, broken up into monthly segments, shown as Month 9 to Month 1, where Month 1 is the most recent month and Month 9 is the most historic month. The y-axis shows units in percentages. This illustration shows data for a merchant that was detected as having a data breach starting around Month 4. As can be seen prior to Month 4, the analyzed merchant had about 3% of all transacting PANs detected as fraudulent in a subsequent period (average month-over-month). Typically such plots display a descending trend, as cards that transact with a merchant in an earlier month have more time to engage in fraudulent transactions. However, in plot 502, during Month 4, there was a spike in percent of transactions that later became fraudulent. The spike stems from increases in fraudulent activity from financial devices that transacted with the merchant during Month 4, and this spike is indica- The above table may be visually displayed in a user interface for analysis of the merchant breach data, and for further preventative action. For example, the above table may be displayed as an interactive table in an online portal for a security personnel. The table includes various columns of output data, including from left to right: merchant name (made generic herein for ease of reference), breach detection date, breach score (output as a confidence score between 0 and 100 from ensembled machine-learning prediction models), estimated breach date, number of PANs used at the merchant in the last 180 days, number of PANs used in the last 180 days that were determined to have fraudulent activity, percent of PANs used in the last 180 days that were determined to have fraudulent activity, and total number of PANs affected (such as calculated as the number of unique PANs that completed transactions with the merchant since the estimated breach date). In this manner, a user may select a merchant and view additional data from the breach analysis, such as a month-over-month graph shown in FIG. 4. Moreover, a user may assess the impact of a data breach relative to number of PANs affected and the confidence of the underlying algorithms. It will be appreciated that there is a strong correlation between percentages of PANs with fraudulent activity and the confidence score of breach. It will also be appreciated that this method allows for early detection of breach, before a data breach is determined or self-reported by merchants or third party security vendors.

Although the disclosure has been described in detail for the purpose of illustration based on what is currently considered to be the most practical and preferred and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for early detection of and response to a merchant data breach through machine-learning analysis, comprising:

receiving, with at least one processor, transaction authorization request data associated with a plurality of transaction authorization requests processed by a transaction service provider in an electronic payment processing network;

receiving, with at least one processor, fraudulent transaction data associated with at least one previously identified data-breach incident;

receiving, with at least one processor, clearing and settlement data associated with a plurality of transactions processed by the transaction service provider;

receiving, with at least one processor, fraud report data associated with prior fraud reported by financial device holders;

receiving, with at least one processor, merchant data for a plurality of merchants;

generating, with at least one processor, at least one metric based on a percentage of security-testing transaction activity associated with a plurality of personal account numbers (PANs) that transacted with one or more merchants of the plurality of merchants;

generating, with at least one processor, a plurality of features for training one or more machine-learning models, the plurality of features based on the transaction authorization request data, the fraudulent transaction data, the clearing and settlement data, the fraud report data, the merchant data, and the at least one metric;

generating, with at least one processor, a first model input dataset based on the plurality of features and associated with the plurality of merchants;

generating, with at least one processor, a second model input dataset based on the plurality of features and associated with at least one previously breached merchant of the plurality of merchants;

training, with at least one processor, a first machine-learning prediction model of an ensembled model and a second machine-learning prediction model of the ensembled model to associate merchants with a likelihood of data breach, the first machine-learning prediction model comprising a neural network machine-learning model, and the second machine-learning prediction model comprising a gradient boosted decision tree model, wherein training the first machine-learning prediction model and the second machine-learning prediction model comprises:

comparing the first model input dataset to the second model input dataset;

determining at least one difference between at least one feature of the first model input dataset and at least one feature of the second model input dataset based on the comparing of the first model input dataset to the second model input dataset; and training the first machine-learning prediction model and the second machine-learning prediction model to associate merchants with a likelihood of data breach based on the at least one difference;

determining, with at least one processor and based at least partly on the transaction authorization request data and at least partly on an output of the ensembled model, at least one breached merchant, wherein determining the at least one breached merchant further comprises:

combining a first output of the first machine-learning prediction model and a second output of the second machine-learning prediction model to produce an ensembled score;

comparing the ensembled score to a threshold; and in response to the ensembled score satisfying the threshold, determining that the at least one breached merchant experienced a data breach;

in response to determining the at least one breached merchant:

automatically freezing, with at least one processor, at least one transaction in the electronic payment processing network; and automatically deactivating, with at least one processor, at least one portable financial device used for at least one prior transaction with the at least one breached merchant, wherein deactivating the at least one portable financial device comprises suspending the at least one portable financial device from completing future transactions associated with future transaction authorization requests in the electronic payment processing network;

retraining, with at least one processor, the first machine-learning prediction model and the second machine-learning prediction model based on transaction data associated with the at least one breached merchant that was determined based on the ensembled model, to produce an updated first machine-learning prediction model and an updated second machine-learning prediction model; and determining, with at least one processor, at least one other breached merchant based on the updated first machine-learning prediction model and the updated second machine-learning prediction model.

2. The computer-implemented method of claim 1, further comprising determining, with at least one processor and based at least partly on portable financial device identifiers of the transaction authorization request data, the at least one portable financial device associated with the at least one prior transaction with the at least one breached merchant.

3. The computer-implemented method of claim 2, wherein the at least one portable financial device comprises a plurality of portable financial devices, and wherein the plurality of transaction authorization requests are associated with a plurality of financial device holders.

4. The computer-implemented method of claim 3, further comprising communicating, with at least one processor, a message to each financial device holder of the plurality of financial device holders, the message being automatically generated and comprising at least part of the transaction authorization request data for a respective transaction of the financial device holder, and the message further comprising a prompt for the financial device holder to authorize a chargeback request for the at least one prior transaction with the at least one breached merchant.

5. The computer-implemented method of claim 1, further comprising communicating, with at least one processor, a message to at least one user of the at least one portable financial device to alert the at least one user of the at least one breached merchant, the message comprising a warning notification configured to be visually represented on a display device for the at least one user to take further preventative action.

6. The computer-implemented method of claim 5, further comprising storing, with at least one processor and in a merchant profile database, correspondence information for a point-of-contact for each of a plurality of merchants, wherein the at least one user comprises at least one point-of-contact of the plurality of merchants.

7. A system for early detection of and response to a merchant data breach through machine-learning analysis, the system comprising at least one server computer including at least one processor, the at least one server computer programmed and/or configured to:

receive transaction authorization request data associated with a plurality of transaction authorization requests processed by a transaction service provider in an electronic payment processing network;

receive fraudulent transaction data associated with at least one previously identified data-breach incident;

receive clearing and settlement data associated with a plurality of transactions processed by the transaction service provider;

receive fraud report data associated with prior fraud reported by financial device holders;

receive merchant data for a plurality of merchants;

generate at least one metric based on a percentage of security-testing transaction activity associated with a plurality of personal account numbers (PANs) that transacted with one or more merchants of the plurality of merchants;

generate a plurality of features for training one or more machine-learning models, the plurality of features based on the transaction authorization request data, the fraudulent transaction data, the clearing and settlement data, the fraud report data, the merchant data, and the at least one metric;

generate a first model input dataset based on the plurality of features and associated with the plurality of merchants;

generate a second model input dataset based on the plurality of features and associated with at least one previously breached merchant of the plurality of merchants;

train a first machine-learning prediction model of an ensembled model and a second machine-learning prediction model of the ensembled model to associate merchants with a likelihood of data breach, the first machine-learning prediction model comprising a neural network machine-learning model, and the second machine-learning prediction model comprising a gradient boosted decision tree model, wherein, when training the first machine-learning prediction model and the second machine-learning prediction model, the at least one server computer is programmed and/or configured to:

compare the first model input dataset to the second model input dataset;

determine at least one difference between at least one feature of the first model input dataset and at least one feature of the second model input dataset based on the comparing of the first model input dataset to the second model input dataset; and train the first machine-learning prediction model and the second machine-learning prediction model to associate merchants with a likelihood of data breach based on the at least one difference;

determine, based at least partly on the transaction authorization request data and at least partly on an output of the ensembled model, at least one breached merchant, wherein, when determining the at least one breached merchant, the at least one server computer is programmed and/or configured to:

combine a first output of the first machine-learning prediction model and a second output of the second machine-learning prediction model to produce an ensembled score;

compare the ensembled score to a threshold; and in response to the ensembled score satisfying the threshold, determining that the at least one breached merchant experienced a data breach;

in response to determining the at least one breached merchant:

automatically freeze at least one transaction in the electronic payment processing network; and automatically deactivate at least one portable financial device used for at least one prior transaction with the at least one breached merchant, wherein, when deactivating the at least one portable financial device, the at least one server computer is programmed and/or configured to suspend the at least one portable financial device from completing future transactions associated with future transaction authorization requests in the electronic payment processing network;

retrain the first machine-learning prediction model and the second machine-learning prediction model based on transaction data associated with the at least one breached merchant that was determined based on the ensembled model, to produce an updated first machine-learning prediction model and an updated second machine-learning prediction model; and determine at least one other breached merchant based on the updated first machine-learning prediction model and the updated second machine-learning prediction model.

8. The system of claim 7, wherein the at least one server computer is further programmed and/or configured to determine, based at least partly on portable financial device identifiers of the transaction authorization request data, the at least one portable financial device associated with the at least one prior transaction with the at least one breached merchant.

9. The system of claim 8, wherein the at least one portable financial device comprises a plurality of portable financial devices, and wherein the plurality of transaction authorization requests are associated with a plurality of financial device holders.

10. The system of claim 9, wherein the at least one server computer is further programmed and/or configured to communicate a message to each financial device holder of the plurality of financial device holders, the message being automatically generated and comprising at least part of the transaction authorization request data for a respective transaction of the financial device holder, and the message further comprising a prompt for the financial device holder to authorize a chargeback request for the at least one prior transaction with the at least one breached merchant.

11. The system of claim 7, wherein the at least one server computer is further programmed and/or configured to communicate a message to at least one user of the at least one portable financial device to alert the at least one user of the at least one breached merchant, the message comprising a warning notification configured to be visually represented on a display device for the at least one user to take further preventative action.

12. A computer program product for early detection of and response to a merchant data breach through machine-learning analysis, the computer program product comprising at least one non-transitory computer-readable medium including program instructions that, when executed by at least one processor, cause the at least one processor to:

receive transaction authorization request data associated with a plurality of transaction authorization requests processed by a transaction service provider in an electronic payment processing network;

receive fraudulent transaction data associated with at least one previously identified data-breach incident;

receive clearing and settlement data associated with a plurality of transactions processed by the transaction service provider;

receive fraud report data associated with prior fraud reported by financial device holders;

receive merchant data for a plurality of merchants;

generate at least one metric based on a percentage of security-testing transaction activity associated with a plurality of personal account numbers (PANs) that transacted with one or more merchants of the plurality of merchants;

generate a plurality of features for training one or more machine-learning models, the plurality of features based on the transaction authorization request data, the fraudulent transaction data, the clearing and settlement data, the fraud report data, the merchant data, and the at least one metric;

generate a first model input dataset based on the plurality of features and associated with the plurality of merchants;

generate a second model input dataset based on the plurality of features and associated with at least one previously breached merchant of the plurality of merchants;

train a first machine-learning prediction model of an ensembled model and a second machine-learning prediction model of the ensembled model to associate merchants with a likelihood of data breach, the first machine-learning prediction model comprising a neural network machine-learning model, and the second machine-learning prediction model comprising a gradient boosted decision tree model, wherein the program instructions that cause the at least one processor to train the first machine-learning prediction model and the second machine-learning prediction model cause the at least one processor to:

compare the first model input dataset to the second model input dataset;

determine at least one difference between at least one feature of the first model input dataset and at least one feature of the second model input dataset based on the comparing of the first model input dataset to the second model input dataset; and train the first machine-learning prediction model and the second machine-learning prediction model to associate merchants with a likelihood of data breach based on the at least one difference;

determine, based at least partly on the transaction authorization request data and at least partly on an output of the ensembled model, at least one breached merchant, wherein the program instructions that cause the at least one processor to determine the at least one breached merchant cause the at least one processor to:

combine a first output of the first machine-learning prediction model and a second output of the second machine-learning prediction model to produce an ensembled score;

compare the ensembled score to a threshold; and in response to the ensembled score satisfying the threshold, determining that the at least one breached merchant experienced a data breach;

in response to determining the at least one breached merchant:

automatically freeze at least one transaction in the electronic payment processing network; and automatically deactivate at least one portable financial device used for at least one prior transaction with the at least one breached merchant, wherein the program instructions that cause the at least one processor to deactivate the at least one portable financial device cause the at least one processor to suspend the at least one portable financial device from completing future transactions associated with future transaction authorization requests in the electronic payment processing network;

retrain the first machine-learning prediction model and the second machine-learning prediction model based on transaction data associated with the at least one breached merchant that was determined based on the ensembled model, to produce an updated first machine-learning prediction model and an updated second machine-learning prediction model; and determine at least one other breached merchant based on the updated first machine-learning prediction model and the updated second machine-learning prediction model.

* * * * *